United States Patent
Zhang et al.

(10) Patent No.: US 12,556,057 B2
(45) Date of Patent: Feb. 17, 2026

(54) SUPPORT STRUCTURE FOR LINEAR MOTOR

(71) Applicant: DONGGUAN CHI DRIVE MOTORS CO., LTD, Dongguan (CN)

(72) Inventors: Zhenjian Zhang, Jiangmen (CN); Tianyou Cao, Yiyang (CN)

(73) Assignee: DONGGUAN CHI DRIVE MOTORS CO., LTD, Dongguan (CN)

( * ) Notice: Subject to any disclaimer, the term of this patent is extended or adjusted under 35 U.S.C. 154(b) by 0 days.

(21) Appl. No.: 19/274,977

(22) Filed: Jul. 21, 2025

(65) Prior Publication Data

US 2025/0350165 A1 Nov. 13, 2025

(30) Foreign Application Priority Data

Apr. 8, 2025 (CN) .......................... 202520651975.4

(51) Int. Cl.
| | |
|---|---|
| *H02K 33/18* | (2006.01) |
| *B26B 19/28* | (2006.01) |
| *B26B 19/38* | (2006.01) |
| *F16M 1/02* | (2006.01) |
| *H02K 5/04* | (2006.01) |

(52) U.S. Cl.
CPC .......... *H02K 5/04* (2013.01); *B26B 19/3853* (2013.01); *F16M 1/02* (2013.01); *H02K 33/18* (2013.01)

(58) Field of Classification Search
CPC ............ H02K 5/00; H02K 5/04; H02K 33/00; H02K 33/02; H02K 33/04; H02K 33/06; H02K 33/10; H02K 33/16; H02K 33/18; H02K 41/00; B26B 19/00; B26B 19/04; B26B 19/06; B26B 19/28; B26B 19/282; B26B 19/288; H02P 25/032

See application file for complete search history.

(56) References Cited

U.S. PATENT DOCUMENTS

| | | | | |
|---|---|---|---|---|
| 5,632,087 | A | * | 5/1997 | Motohashi ............ B26B 19/282 30/43.92 |
| 5,921,134 | A | * | 7/1999 | Shiba .................... B26B 19/282 310/20 |
| 6,991,217 | B2 | * | 1/2006 | Shimizu ................ B26B 19/288 310/12.01 |
| 11,052,553 | B2 | * | 7/2021 | Murakami ............... H02K 7/04 |
| 2005/0134123 | A1 | * | 6/2005 | Kobayashi ............ H02K 33/16 310/36 |
| 2005/0140219 | A1 | * | 6/2005 | Sanematsu ............ H02K 33/16 310/15 |
| 2023/0340977 | A1 | | 10/2023 | Maruyama |
| 2023/0344053 | A1 | | 10/2023 | Taga et al. |
| 2024/0159349 | A1 | | 5/2024 | Szmoleniczki et al. |

* cited by examiner

*Primary Examiner* — Tran N Nguyen
(74) *Attorney, Agent, or Firm* — Zhigang Ma

(57) ABSTRACT

A support structure for a linear motor includes top covers, side plates, a mounting base and a stator core. The top covers, the side plates and the mounting base are integrally connected to form a closed ring, and a semi-enclosed structure is eliminated, such that the top covers, the side plates and the mounting base form a more stable connection structure and are mutually restrained and stressed more uniformly, thus improving the safety in production and assembly; moreover, the stator core and magnets are assembled by insertion and do not need to be locked with screws, such that assembly is easier.

7 Claims, 4 Drawing Sheets

SUPPORT STRUCTURE FOR LINEAR MOTOR

BACKGROUND OF THE INVENTION

Technical Field

The invention relates to the technical field of linear motors, in particular to a support structure for a linear motor.

Description of Related Art

It is commonly known that linear motors, also referred to as magnetically levitated motors, are one type of existing motors and mainly applied to the field of shavers. The linear motor forces two sets of blades on a top cover to move repeatedly by means of a stator coil and two magnet sets arranged on the top cover based on the principle that identical poles repel each other and opposite poles attract each other. As shown in FIG. 1 which is a schematic diagram of the specific structure of an existing linear motor support, the existing linear motor support mainly includes a top cover 1A, support side plates 2A and a mounting base 3A, wherein blades and two magnetic sets are mounted on the top cover 1A, the stator coil is mounted on the mounting base, and the whole linear motor support is a semi-enclosed frame structure. In the operating process, structures on two sides are supported and connected by means of the top cover and the support side plates 2A, so in the production or assembly process of a whole outer frame of the linear motor support, the top cover, the support side plates and the mounting base will be stressed non-uniformly due to the lack of mutual restraint under the action of an external force or due to the influence of a support body on the strength, and the linear motor support (the top cover) is prone to deformation or breakage, leading to a failure of the motor. Moreover, locking with screws is needed in the overall installation process, for example, when mounted on the mounting base, the stator core needs to be locked on the mounting base with screws, thus making installation difficult.

BRIEF SUMMARY OF THE INVENTION

In view of the defects in the prior art, the goal of the invention is to provide a support structure for a linear motor.

To fulfill the above goal, the invention adopts the following technical solution:

A support structure for a linear motor includes top covers, side plates, a mounting base and a stator core. The top covers include two top covers which are separated from and flush with each other, a blade mounting surface for mounting blades is arranged at a top end of each top cover, a magnet is arranged at a bottom end of each top cover, two ends of each top cover are connected to the mounting base by means of the side plates, the mounting base is a frame enclosed all around, sockets are formed in the frame of the mounting base, a first pillar penetrating into a coil is arranged in a middle of the stator core, second pillars are arranged on two sides of the first pillar respectively, third pillars to be inserted into the sockets are arranged on the stator core and located on outer sides of the second pillars, and a distance between the second pillars is equal to a length of a frame opening of the mounting base, such that the second pillars are inserted into a space defined by the mounting base and the top covers and the stator core is located below the magnet.

Preferably, an insertion cavity is formed in a side edge of each top cover, at least two silicon steel sheets are attached to a back of the magnet, the silicon steel sheets are stacked together and inserted into the insertion cavity, and a notch is formed in a position, corresponding to the magnet, of each top cover to uncover the magnet.

Preferably, limiting grooves are formed in outer sides of the silicon steel sheets, and through-holes allowing poles of the blades to be inserted therein are formed in positions, corresponding to the limiting grooves, of the top covers, such that after the poles of the blades are inserted into the through-holes, side faces of the posts are exactly inlaid in the limiting grooves, and the silicon steel sheets are prevented from disengaging from the insertion cavities.

Preferably, through cavities are formed in the side plates.

Preferably, a side end of one top cover is connected to a side end of the other top cover by means of an elastic connector.

Preferably, the elastic connector is U-shaped.

Preferably, the top covers, the side plates, the mounting base and the elastic connector are all made from PC or PPS.

By adopting the above technical solution, the top covers, the side plates and the mounting base are integrally connected to form a closed ring, and a semi-enclosed structure is eliminated, such that the top covers, the side plates and the mounting base form a more stable connection structure and are mutually restrained and stressed more uniformly, thus improving the safety in production and assembly; moreover, the stator core and the magnets are assembled by insertion and do not need to be locked with screws, such that assembly is easier.

DETAILED DESCRIPTION OF THE INVENTION

To better clarify the purposes, technical solutions and advantages of the invention, the invention is described in further detail below in conjunction with accompanying drawings and embodiments. It should be understood that the specific embodiments described here are merely used for explaining the invention rather than limiting the invention.

In the description of the invention, it should be understood that terms such as "central", "longitudinal". "transverse", "length", "width", "thickness", "upper", "lower", "front", "back", "left", "right". "vertical", "horizontal", "top", "bottom", "inner", "outer", "clockwise" and "anticlockwise" are used to indicate directional or positional relations based on the accompanying drawings merely for the purpose of facilitating and simplifying the description of the invention, do not indicate or imply that devices or elements referred to must be in a specific direction or be configured and operated in a specific direction, and thus should not be construed as limitations of the invention. In addition, terms "first" and "second" are merely for the purpose of description and should not be construed as indicating or implying relative importance or implicitly indicate the number of technical features referred to. Therefore, a feature defined by "first" or "second" may explicitly or implicitly indicate the inclusion of one or more said feature. In the description of the invention, "multiple" refers to two mor more, unless otherwise expressly and specifically defined.

In the description of the invention, it should be noted that unless otherwise expressly stated and defined, terms "mount", "link" and "connect" should be understood in a broad sense. For example, "connect" may refer to fixed connection, detachable connection or integrated connection; mechanical connection or electrical connection; direction connection, indirect connection by means of an intermediate medium, or internal connection or interaction of two elements. Those ordinarily skilled in the art may appreciate the specific meanings of these terms in the invention as the case may be.

Figure 1:
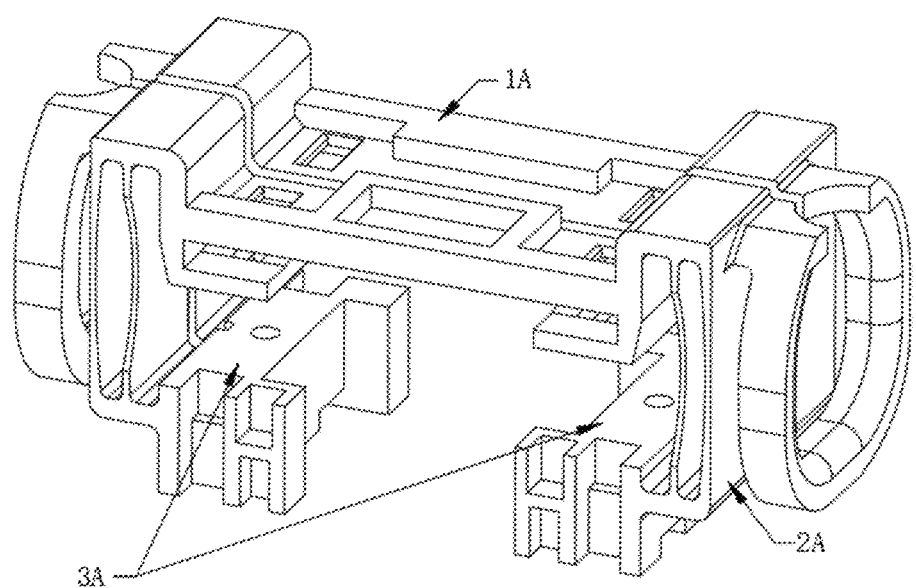
FIG. 1 is a structural diagram of an existing linear motor support in the description of related art of the invention.
Figure 2:
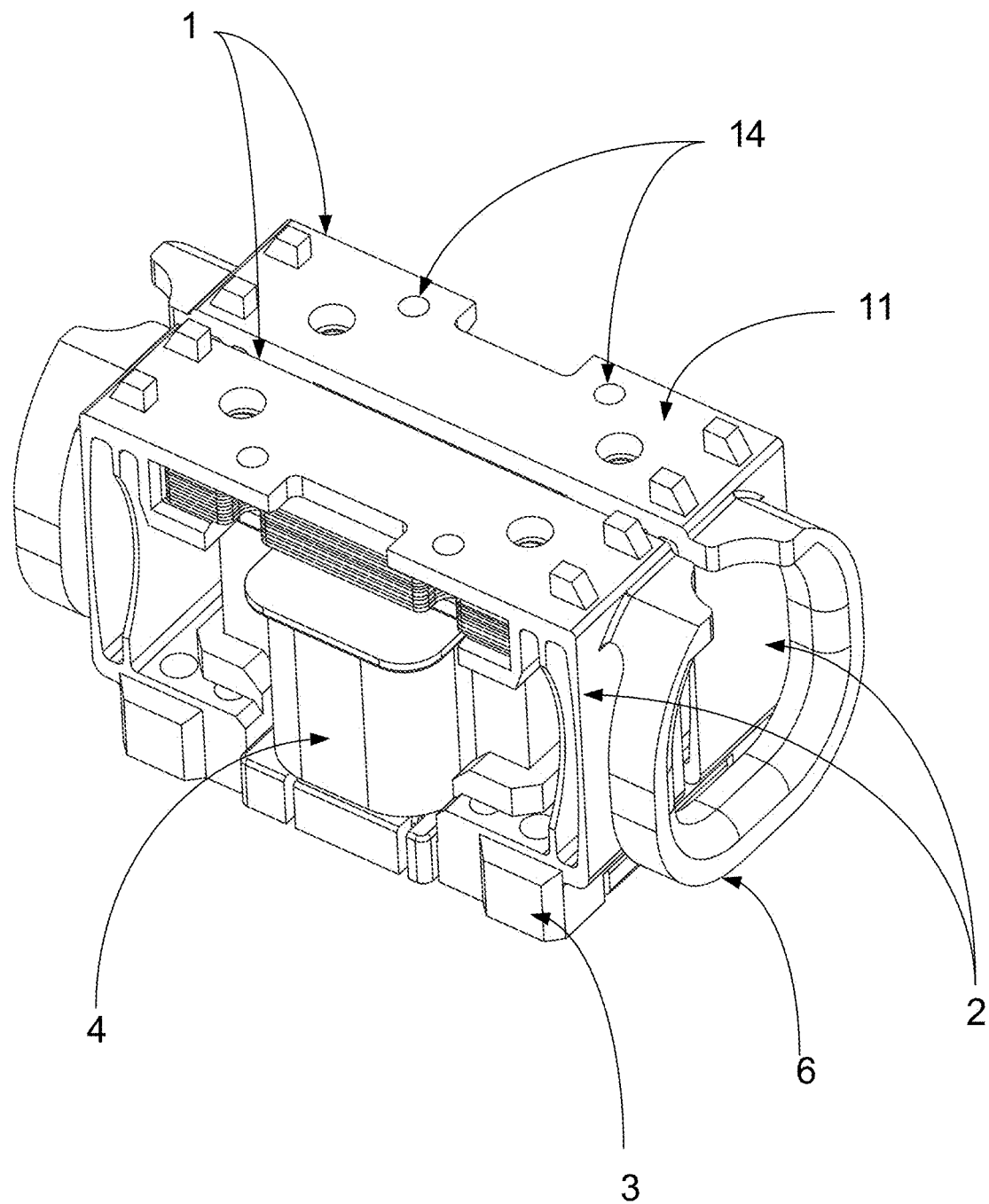
FIG. 2 is a schematic structural diagram according to the invention.
Figure 3:
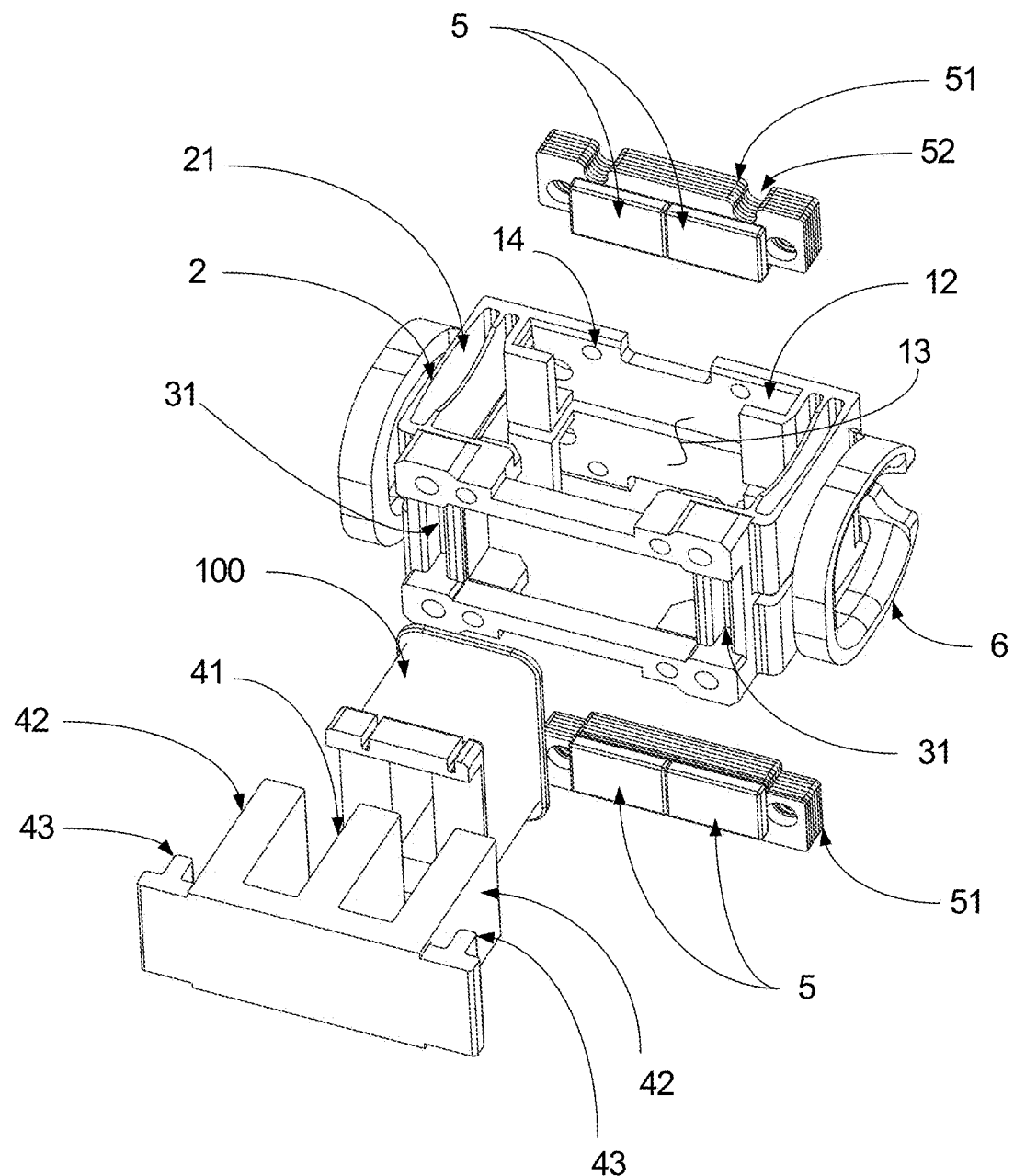
FIG. 3 is an exploded structural view according to the invention.
Figure 4:
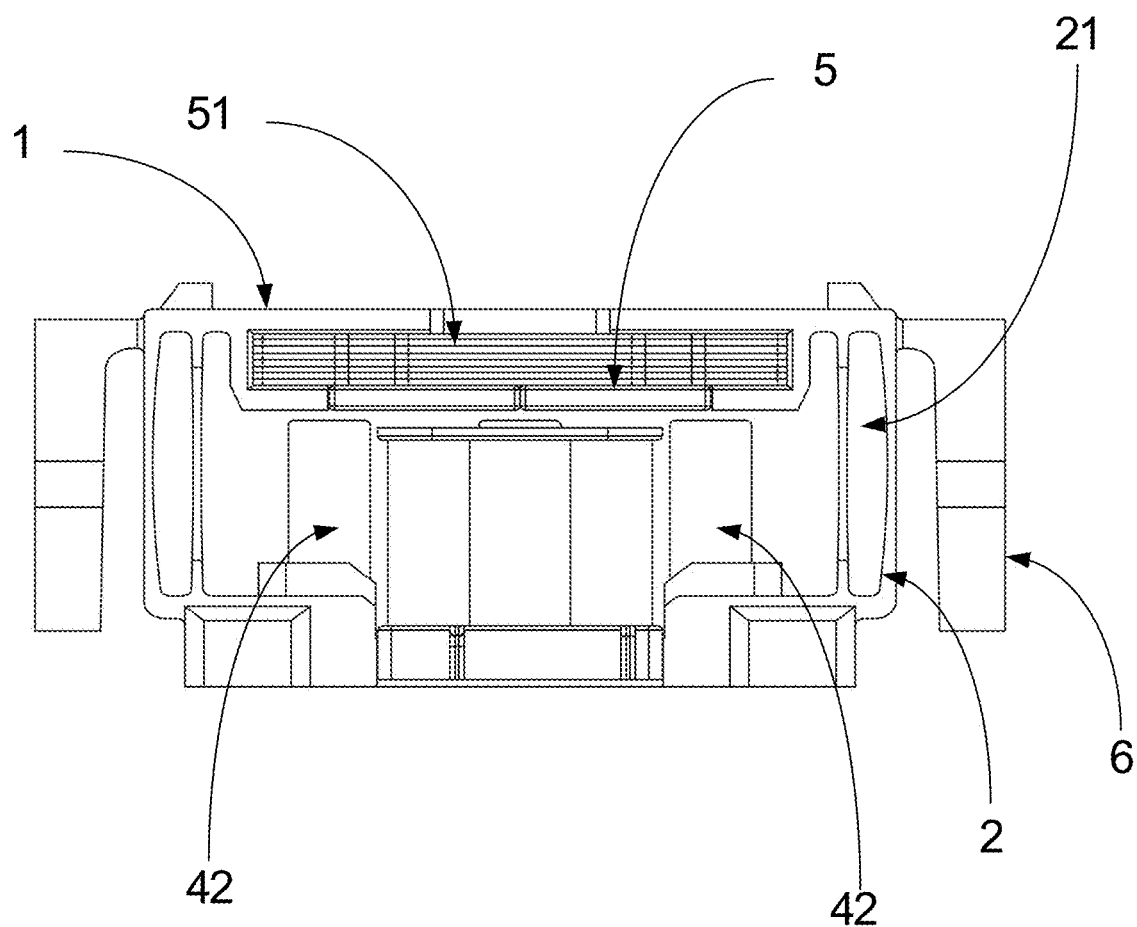
FIG. 4 is a schematic structural diagram of the front side according to the invention.

As shown in FIGS. 2-4, this embodiment provides a support structure for a linear motor, including top covers 1, side plates 2, a mounting base 3 and a stator core 4. The top covers 1 are two plates which are separated from and flush with each other. A blade mounting surface 11 for mounting blades is arranged at a top end of each top cover 1, a magnet 5 is arranged at a bottom end of each top cover 1, and two ends of each top cover 1 are connected to the mounting base 3 by means of the side plates 1. The mounting base 3 is a frame enclosed all around, and sockets 31 are formed in the frame of the mounting base 4. A first pillar 41 penetrating into a coil 100 is arranged in the middle of the stator core 4, second pillars 42 are respectively arranged on two sides of the first pillar 41, third pillars 43 to be inserted into the sockets 31 are arranged on the stator core 4 and located on outer sides of second pillars 42, and the distance between the second pillars 42 is equal to the length of a frame opening of the mounting base 3, such that the second pillars 32 are inserted into a space defined by the mounting base 3 and the top covers 1 and the stator core 4 is located below the magnet 5.

In this embodiment, the top cover 1, the side plates 3 and the mounting base 3 are connected into a whole to form a closed ring, that is to say, two ends of the top cover 1 are connected to the side plates 2, the side plates 2 are connected to the mounting base 3, and the mounting base 3 is an enclosed frame, such that a semi-enclosed design is avoided, the top cover 1, the side plates 2 and the mounting base 3 form a more stable connection structure and are mutually restrained and stressed more uniformly, thus improving the safety in production and assembly. Moreover, the stator core 4 and the magnets 5 are assembled by insertion and locking with screws is not needed, such that assembly is easier. Specifically, the two second pillars 42 are inserted into the frame opening of the mounting base 3, the third pillars 43 are inserted into the sockets 31, and the stator core 4 may be directly mounted on the mounting base 3 under the clamping effect of the second pillars 42 and the third pillars 43, and use of screws is avoided, such that an extra tool such as a screwdriver is not needed in assembly.

Further, to increase the utilization of a magnetic field, in this embodiment, an insertion cavity 12 is formed in a side edge of each top cover 1, at least two silicon steel sheets 51 are attached to the back of the magnet 5, the silicon steel sheets 51 are stacked together and inserted in the insertion cavity 12, and a notch 13 is formed in a position, corresponding to the magnet 5, of each top cover 1 to uncover the magnet 5. By adopting such a design, the silicon steel sheets 51 may be additionally arranged on the back of the magnet 5 to form a Halbach array to reduce the iron loss so as to increase the utilization of a magnetic field, thus improving the working efficiency of the two magnets 5; in addition, the silicon steel sheets 51 may be mounted on the top cover 1 by insertion, that is, the silicon steel sheets 51 are directly attached to the magnets 5 and then inserted into the insertion cavities, thus avoiding the use of screws.

Further, because the top covers 1 need to swing back and forth in the operating process, to prevent the silicon steel sheets 51 from disengaging from the insertion cavities, in this embodiment, limiting grooves 52 are formed in outer sides of the silicon steel sheets 51, and through-holes 14 allowing poles of the blades to be inserted therein are formed in positions, corresponding to the limiting grooves 52, of the top covers 1, such that after the poles of the blades are inserted into the through-holes 14, side faces of the poles of the blades are exactly inlaid in the limiting grooves 52, and the silicon steel sheets 51 are prevented from disengaging from the insertion cavities 12. By adopting such a design, installation positions of the blades are provided, after the blades are installed, the silicon steel sheets 51 are limited and restrained, and the design is extremely ingenious.

Further, to improve the tenacity of the side plates 2, in this embodiment, through cavities 21 are formed in the side plates 2. In this way, the side plates 2 are configured as two sheets to allow the top covers 1 to swing back and forth and fulfill a shock absorption effect. In addition, a side end of one top cover 1 is connected to a side end of the other top cover 1 by means of an elastic connector 6, such that when the top covers 1 swing back and forth, the two top covers 1 will be mutually restrained to keep the swinging force in balance, that is, when the swinging force of one top cover 1 is greater than that of the other top cover 1, the top cover 1 with the greater swinging force will be pulled by the top cover 1 with the smaller swinging force to be restrained from swinging excessively. Because the two top covers 1 swing in opposite directions rather than swinging synchronously in the actual operating process, the top covers 1 connected by means of the elastic connector 6 are restrained by each other to keep the swinging force in balance.

In addition, the elastic connector 6 is U-shaped, and the top covers 1, the side plates 2, the mounting base 3 and the elastic connector 6 are all made from PC or PPS to satisfy the requirement for high tenacity.

The above embodiments are merely preferred ones of the invention and are not intended to limit the patent scope of the invention. All equivalent structural or flow transformations made based on the contents in the specification and drawings, or direct or indirect applications to other related technical fields should also fall within the patent protection scope of the invention.

What is claimed is:

1. A support structure for a linear motor, comprising top covers, side plates, a mounting base and a stator core, wherein the top covers comprise two top covers which are separated from and flush with each other, a blade mounting surface for mounting blades is arranged at a top end of each said top cover, a magnet is arranged at a bottom end of each said top cover, two ends of each said top cover are connected to the mounting base by means of the side plates, the mounting base is a frame enclosed all around, sockets are formed in the frame of the mounting base, a first pillar penetrating into a coil is arranged in a middle of the stator core, second pillars are arranged on two sides of the first pillar respectively, third pillars to be inserted into the sockets are arranged on the stator core and located on outer sides of the second pillars, and a distance between the second pillars is equal to a length of a frame opening of the mounting base, such that the second pillars are inserted into a space defined by the mounting base and the top covers and the stator core is located below the magnet.

2. The support structure for a linear motor according to claim 1, wherein an insertion cavity is formed in a side edge of each said top cover, at least two silicon steel sheets are attached to a back of the magnet, the silicon steel sheets are stacked together and inserted into the insertion cavity, and a notch is formed in a position, corresponding to the magnet, of each said top cover to uncover the magnet.

3. The support structure for a linear motor according to claim 2, wherein limiting grooves are formed in outer sides of the silicon steel sheets, and through-holes are formed in positions, corresponding to the limiting grooves, of the top covers, such that the silicon steel sheets are prevented from disengaging from the insertion cavity.

4. The support structure for a linear motor according to claim 1, wherein through holes are formed in the side plates.

5. The support structure for a linear motor according to claim 1, wherein a side end of one said top cover is connected to a side end of the other top cover by means of an elastic connector.

6. The support structure for a linear motor according to claim 5, wherein the elastic connector is U-shaped.

7. The support structure for a linear motor according to claim 6, wherein the top covers, the side plates, the mounting base and the elastic connector are all made from PC or PPS.

* * * * *